US006982644B2

(12) United States Patent
McDaniel et al.

(10) Patent No.: US 6,982,644 B2
(45) Date of Patent: Jan. 3, 2006

(54) SAFETY DEVICE

(75) Inventors: Dan R. McDaniel, Vancouver, WA (US); Katrina Heiles, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 565 days.

(21) Appl. No.: 10/143,088

(22) Filed: May 9, 2002

(65) Prior Publication Data

US 2003/0216135 A1    Nov. 20, 2003

(51) Int. Cl.
   *G08B 13/14*   (2006.01)
(52) U.S. Cl. .................................. 340/572.1; 455/411
(58) Field of Classification Search ............ 340/572.1, 340/572.4, 3.1, 5.1; 455/411, 419, 420, 1; 455/ 370/310, 229
   See application file for complete search history.

(56) References Cited

U.S. PATENT DOCUMENTS

| | | | |
|---|---|---|---|
| 6,081,559 A | 6/2000 | Leclerc et al. | |
| 6,188,883 B1 * | 2/2001 | Takemura | 455/411 |
| 6,225,897 B1 | 5/2001 | Doyle et al. | |
| 6,292,687 B1 | 9/2001 | Lowell et al. | |
| 6,297,737 B1 | 10/2001 | Irvin | |
| 6,343,213 B1 * | 1/2002 | Steer et al. | 455/411 |
| 6,490,455 B1 * | 12/2002 | Park et al. | 455/411 |
| 2001/0031631 A1 | 10/2001 | Pitts | |
| 2002/0136409 A1 | 9/2002 | Hlle | |
| 2003/0061606 A1 * | 3/2003 | Hartwig et al. | 380/270 |

FOREIGN PATENT DOCUMENTS

| | | |
|---|---|---|
| EP | 1041847 A1 | 10/2000 |
| GB | 2343088 A | 4/2000 |
| GB | 2355889 A | 5/2001 |
| WO | WO 02/056630 | 7/2002 |

* cited by examiner

*Primary Examiner*—Thomas Mullen

(57) ABSTRACT

A safety device includes a radio frequency (RF) receiver, an RF transmitter, and a controller coupled to the receiver and transmitter. The controller utilizes at least one discovery protocol to determine the presence of a radiator. Discovery protocol commands are provided to disable or create an alarm on the radiator. A cardiac device and an airplane including a safety device are also provided. Related safety methods are included.

37 Claims, 6 Drawing Sheets

SAFETY DEVICE

Electronic devices, including portable consumer electronics such as portable computers, cellular phones, portable electronic games, radios, portable compact disc players, electric razors, etc. have become widely available in recent years as a result of advances in technology which have made possible the miniaturization of electronic components. The increased portability of electronic devices has caused them to become widely utilized in a variety of places. An extremely popular situation where portable electronic devices are used is during airplane travel, particularly during long airplane flights.

Recently, there has been great concern over the use of electronic devices aboard aircraft. Specifically, there is concern that the electronic devices act as sources of electromagnetic interference (EMI) which may affect an aircraft's avionics and other electronic equipment. This EMI can potentially produce disastrous results if the interference occurs at an inopportune time during a flight, such as take-off or landing. As a precaution, airplane passengers are routinely requested to turn off all electronic devices during take-off and landing. In fact, Federal Regulation 14 C.F.R. § 135.144 prohibits operation of most portable electronic devices on U.S. registered civil aircraft.

Some electronic devices may interfere with the aircraft's avionics and other aircraft equipment by giving off radio frequency (RF) emissions in the course of their designed operation. Intentional RF emissions can be a form of EMI. Transmitting devices, such as cellular phones, generate strong narrow band RF signals, while non-transmitting devices, such as laptop computers without wireless capability, emit weak but broadband RF signals as a side effect of their operation while communicating. Modern avionics systems are becoming increasingly susceptible to interference caused by the RF emissions, especially strong signals, because the avionics utilize smaller circuit elements which require less energy to be damaged or to change their electrical state. Due to the varying conductor lengths between circuits in the avionics systems, and due to exposed connections, the systems are also susceptible to weak broadband interference. If a passenger's electronic devices produce radiation at the critical frequencies of the avionics' operating sources or produce intermediate signals with enough strength, they could confuse or disable an aircraft's avionics and other aircraft electronic equipment including navigation and communication gear.

Various methods for solving the problem caused by EMI from electronic devices aboard aircraft have been proposed. Banning all electronic devices from being present on an airplane is not preferable, as it would deprive travelers of the tools they may need when arriving at their destination. Travelers, can be asked, as they are now, to turn off all electronic devices during critical times of the flight, such as take-offs and landing. This type of procedure relies on the honor system, the ability of the travelers to hear and understand airline steward instructions to turn off electronic devices, a visual inspection by the stewards of the travelers to ensure that electronic devices are turned off, and the assumption that the devices in question are within the traveler's immediate reach and not stored in an overhead bin or in the cargo area of the airplane. In some cases the preceding conditions are met, and electronic devices are easy to visually detect in operation by a steward while walking up and down an airplane aisle. However, there are increasingly devices, such as personal digital assistants (PDA's) and cellular phones, which are small enough to be hidden away in a pocket or bag, and while apparently not in use, these devices may be operating in an "unconscious mode", where transmission can be occurring without the user's knowledge, even if to the user or owner, the device appears to be turned off. While operating in this unconscious mode, the device may be continuously or periodically "looking" for other devices in the vicinity, by transmitting a coded RF signal, to establish two-way communication. This transmission, whether deliberate or not, may violate federal regulations when present on a commercial airplane.

In addition to the world of avionics, such RF transmissions can endanger individuals who use a cardiac device, by interfering with the operation of the cardiac device, if the RF power level is high enough or if the RF transmitter is in close proximity.

DETAILED DESCRIPTION OF THE PREFERRED EMBODIMENTS

Figure 1:
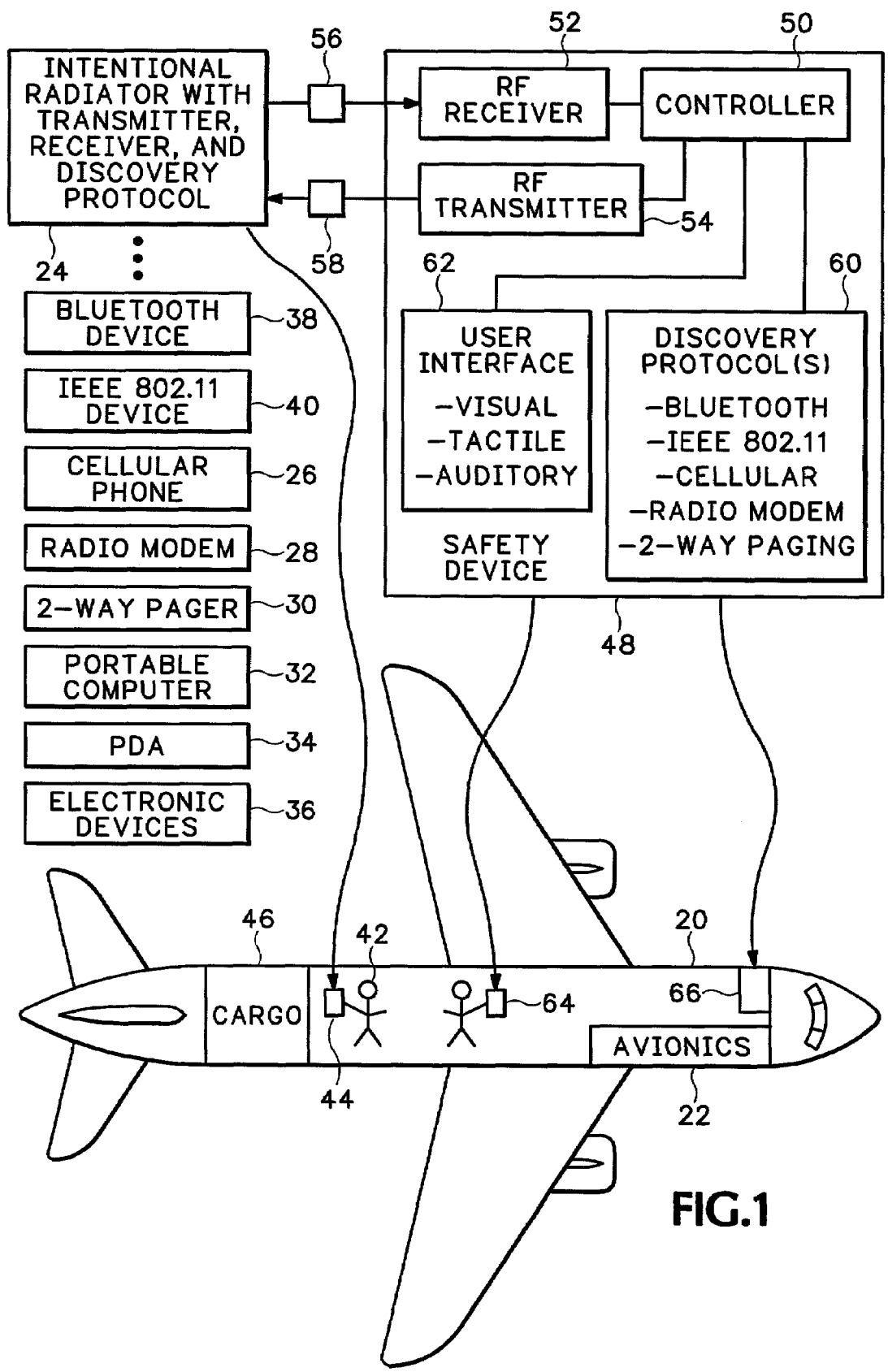
FIG. 1 is a schematic illustration of one embodiment of a safety device for use in the detection, prevention and/or avoidance of unwanted or potentially harmful RF radiation from electronic devices utilizing a discovery protocol.

In order to protect an airplane's 20 avionics 22 and assist an airplane crew in determining the presence of radiators 24 within the airplane 20, a safety device 48 may be used. Examples of radiators 24 may include cellular phones 26, radio modems 28, two-way pagers 30, portable computers 32, personal data assistants (PDA's) 34, or electronic devices 36 which utilize a discovery protocol, for example, a Bluetooth device 38, or an IEEE 802.11 device 40.

A discovery protocol, such as Bluetooth, allows electronic devices having both a transmitter and a receiver to form a connection with other electronic devices speaking the same protocol. These electronic devices are radiators 24 which can actively transmit coded instructions inquiring about the presence of other devices equipped with the same discovery protocol within the transmission and reception vicinity of the intentional radiator 24. Nearby devices receiving a discovery protocol inquiry can respond with identifying information which allows the intentional radiator 24 to differentiate between and communicate with more than one discovery protocol device at a given time.

While these discovery protocol communications are desirable and useful most of the time, they can prove hazardous to an airplane's 20 avionics 22. When a person 42 carries a portable electronic device 44, which is capable of intentionally radiating RF signals to implement a discovery protocol, onboard an airplane 20, the airplane crew will likely not be able to identify the danger because the portable electronic device 44 may be hidden from view or visibly appear to be turned "off". It is harder still for the airplane crew to know if there are dangerous RF transmissions coming from a cargo area 46 of the airplane 20, where radiators 24 may also be stored.

FIG. 1 schematically illustrates one embodiment of a safety device 48. The safety device 48 has a controller 50 which may include an application specific integrated circuit (ASIC), a suitably programmed microprocessor, discrete logic components, a separate computer with an operating system and control program, or any combination thereof. The safety device 48 also has an RF receiver 52 and an RF transmitter 54 which are coupled to the controller 50. The RF receiver 52 and controller 50 monitor for incoming coded data sequences 56. The RF transmitter 54 and controller 50 transmit outgoing coded data sequences 58. The controller 50 may be configured to receive and transmit one or more discovery protocols 60, including Bluetooth, IEEE 802.11, cellular communication, radio modem, and/or two-way paging. The safety device 48 has a user interface 62, coupled to the controller 50, which may be visual, tactile, and/or auditory in this embodiment. The safety device 48 may be configured as a portable safety device 64, or as a safety device 66 which is integrated into the airplane 20.

Figure 2:
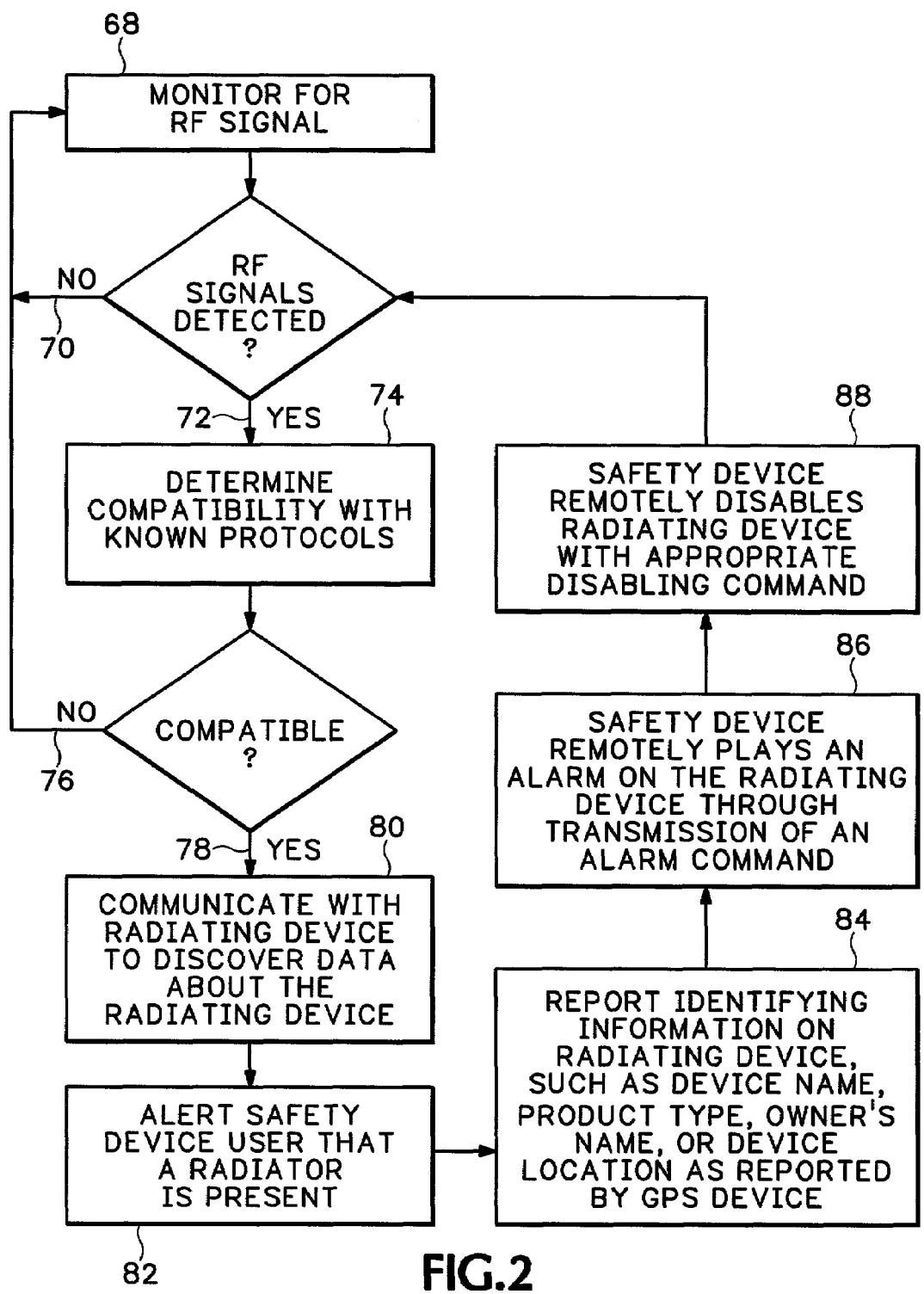
FIG. 2 illustrates one embodiment of actions which may be performed by a safety device for use in the detection, prevention and/or avoidance of unwanted or potentially harmful RF radiation from electronic devices utilizing a discovery protocol.

FIG. 2 illustrates one embodiment of actions which may be performed by the safety device 48. The safety device 48 monitors 68 for an RF signal from a radiator 24. If no RF signals are detected 70, the safety device 48 continues to monitor 68. If the safety device 48 detects 72 an RF signal, the controller then determines 74 compatibility with known discovery protocols 60. If the signal data is not compatible 76 with the known discovery protocols 60, then the safety device 48 continues to monitor 68 for more RF signals. If the signal data is compatible 78 with the known discovery protocols, then the safety device 48 communicates 80 with the radiating device 24 to discover information about the radiating device 24. The safety device 48 performs these communications 80 by using the known discovery protocol which was identified in action 74 to transmit queries and instructions with the RF transmitter 54 to the radiator 24 and listen for responses with the RF receiver 52.

At any time after compatibility with a known discovery protocol has been determined 78, a safety device 48 with a user interface 62 may alert 82 a safety device user that an undesired RF signal from a known device is present or in proximity to the safety device 48. This alert can be visual, tactile, or auditory.

At any time after discovering information 80 about the radiating device, identifying information may be reported 84 to the user. Such information on the radiating device 24 may include device name, product type, owner name, or device location (if communicating with a global positioning system (GPS) device). This information may then be used by the airplane crew to help locate the radiator.

At any time after compatibility with a known discovery protocol has been determined 78, a safety device 48 may remotely play 86 an alarm on the radiator 24 through transmission of an alarm command in the discovery protocol. The sounding alarm on the radiator 24 may help the airplane crew to locate the offending device, or the alarm may alert the device owner that they have an actively transmitting device which needs to be disabled.

At any time after compatibility with a known discovery protocol has been determined 78, a safety device 48 may remotely disable 88 the radiator 24 with an appropriate disabling command in the discovery protocol. This action would not require intervention on the part of the airplane crew.

The actions illustrated in FIG. 2 represent one embodiment of actions which may be performed by a safety device 48. A safety device 48 may also perform a subset of the actions illustrated in the embodiment of FIG. 2.

Figure 3:
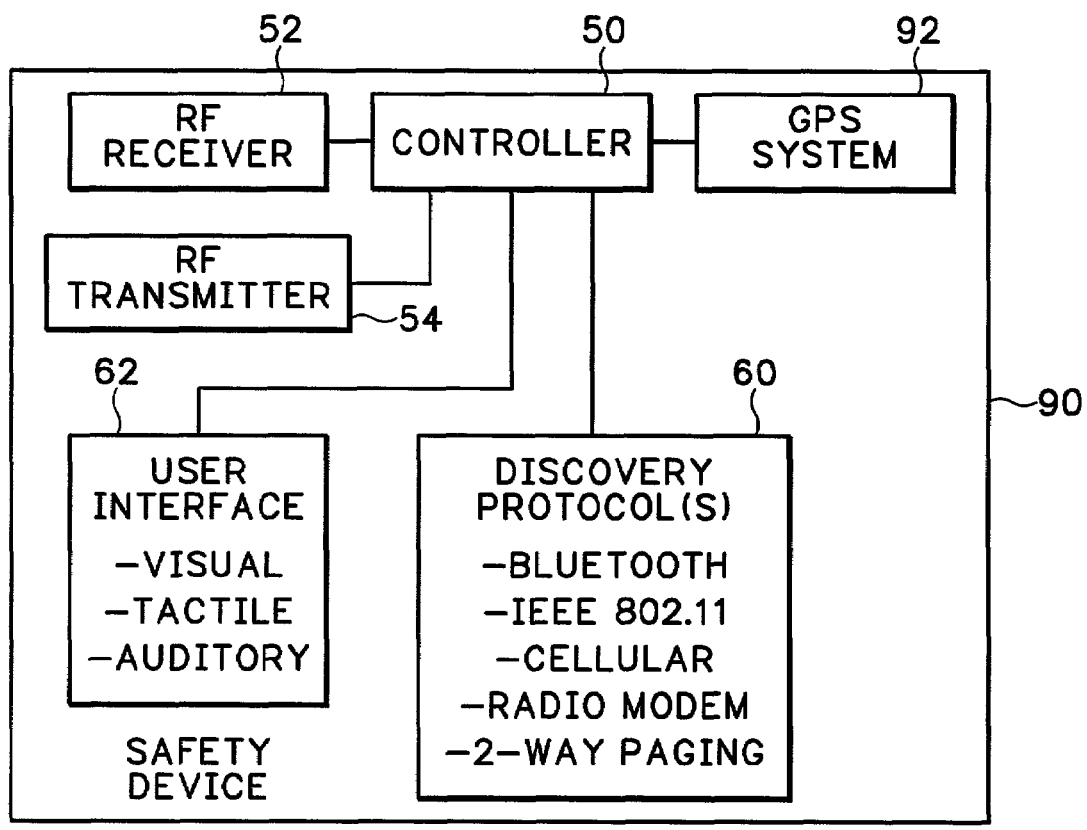
FIG. 3 is a schematic illustration of one embodiment of a safety device for use in the detection, prevention, and/or avoidance of unwanted or potentially harmful RF radiation from electronic devices utilizing a discovery protocol.

FIG. 3 schematically illustrates another embodiment of a safety device 90. Safety device 90 in FIG. 3 is similar to safety device 48 in FIG. 1, with the addition of a global positioning system 92 (GPS) coupled to the controller 50. In situations where the safety device 90 is communicating with a radiator 24 which has its own GPS capabilities, the safety device 90 can discover the GPS position of the radiator 24, compare it with the safety device GPS location and provide instructions to a safety device user on how to locate the radiator 24.

Figure 4:
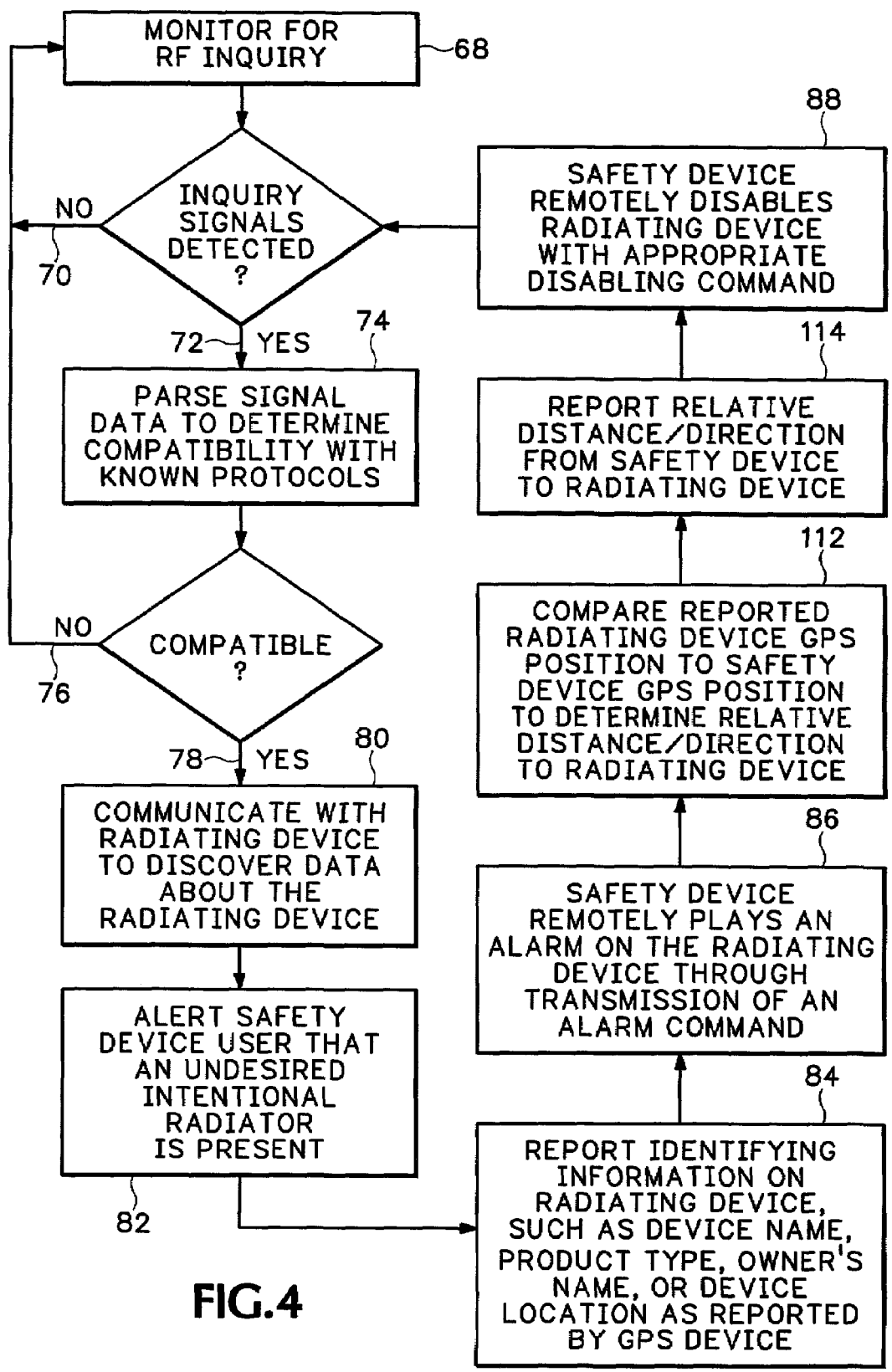
FIG. 4 illustrates one embodiment of actions which may be performed by a safety device for use in the detection, prevention and/or avoidance of unwanted or potentially harmful RF radiation from electronic devices utilizing a discovery protocol.

FIG. 4 illustrates one embodiment of actions which may be performed by the safety device 90. The safety device 90 may perform actions 68–88 as already discussed with regard to FIG. 2. Additionally, in the embodiment illustrated in FIG. 4, at any time after discovering information 80 about the radiating device 24, the controller 50 may compare a reported radiating device 24 GPS position to the safety device GPS position (as determined by GPS system 92) to determine 112 the relative distance and/or direction from the safety device 90 to the undesired intentional radiating device 24. The relative distance and/or direction from the safety device 90 to the undesired intentional radiating device 24 may then be reported 114 to the safety device user.

The actions illustrated in FIG. 4 represent one embodiment of actions which may be performed by a safety device 90. A safety device 90 may also perform a subset of the actions illustrated in the embodiment of FIG. 4.

Figure 5:
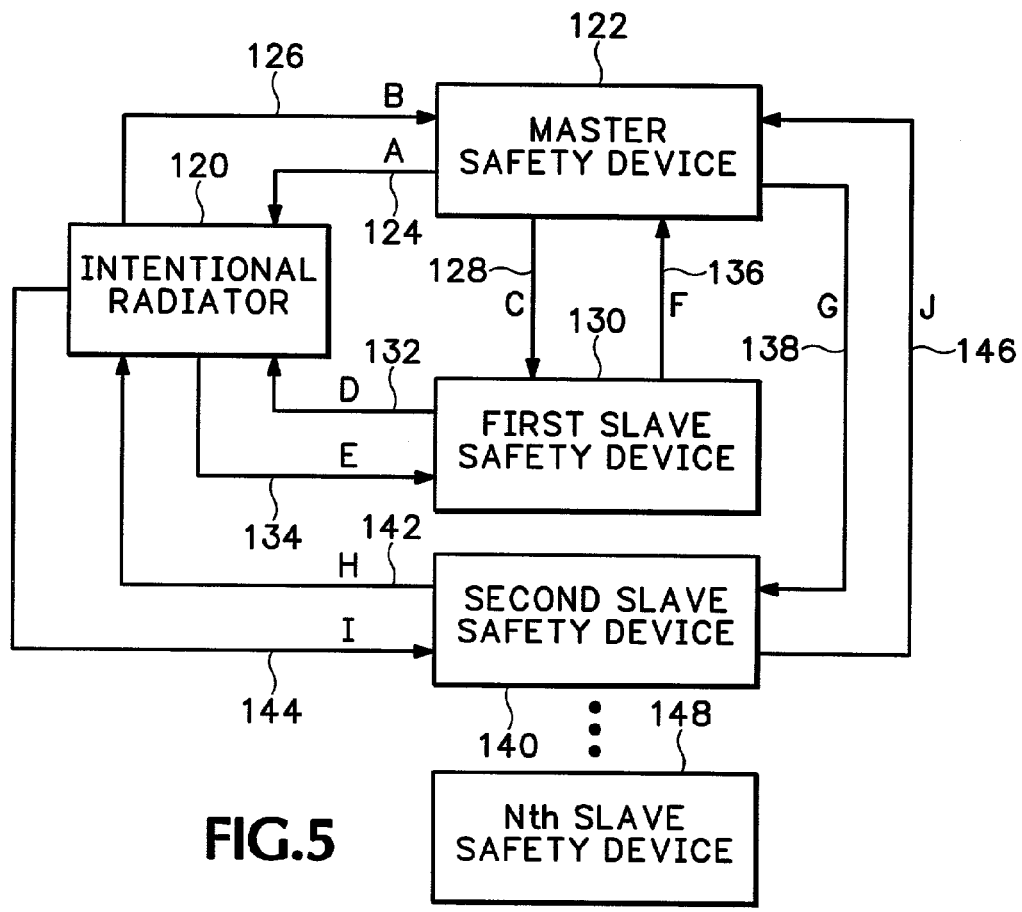
FIG. 5 schematically illustrates one embodiment of using multiple safety devices for use in the detection, prevention and/or avoidance of unwanted or potentially harmful RF radiation from electronic devices utilizing a discovery protocol.

FIG. 5 illustrates one embodiment of using multiple safety devices 48, 90 in conjunction with one another to help locate an intentional radiator 120 which speaks a known discovery protocol, but may not accept disabling, or alarm commands, and may not provide GPS information. A master safety device 122, after initially determining that an intentional radiator 120 speaking a discovery protocol is present, queries 124 the intentional radiator 120 using discovery commands as represented by line A. The intentional radiator 120 responds 126 as represented by line B. From this interchange the master safety device 122 makes a determination of the distance from the intentional radiator 120 to the master safety device 122. Since the master safety device 122 is screening for discovery protocol signals, the master safety device 122 identifies a valid radiator 120, but the direction to the device is not known. The master safety device 122 then communicates 128 with a first slave safety device 130 as represented by line C. The first slave safety device 128 then communicates 132, 134 with the intentional radiator 120 as represented by lines D and E. As a result of these communications 132, 134, the first slave safety device 130 determines a distance from the intentional radiator 120 to the first slave safety device 130. The first safety device 130 then communicates 136 this distance information to the master safety device 122, as represented by line F. At this point, the master safety device 122 still may not be able to determine the location of the intentional radiator 120. The master safety device 122 then communicates 138 with a second slave safety device 140 as represented by line G. The second slave safety device 140 communicates 142, 144 with the intentional radiator 120 as represented by lines H and I. As a result of these communications 142, 144, the second slave safety device 140 determines a distance from the intentional radiator 120 to the second slave safety device 140. The second safety device 140 then communicates 146 this distance information to the master safety device 122, as represented by line J. Using its own distance calculations as well as the distance calculations from the slave safety devices 130, 140, the master safety device 122 triangulates on the position of the intentional radiator 120, and the airplane crew should know that they are locating a signal source they can disable because the intentional radiator 120 has been pre-screened with the discovery protocol. Additional slave safety devices 148 may be utilized for more accuracy as desired.

Triangulation is preferably used while the airplane 20 is on the ground. In the air, the speed of the airplane 20 may limit the effectiveness of triangulation. Additionally, the triangulation process may result in increased RF signals from the safety devices 122, 130, 140, and 148 and the radiator 120. It may be beneficial to allow the increased RF signals during the triangulation process, especially while the airplane 20 is on the ground, in order to avoid long-term RF-interference during flight. It may also be beneficial to alert the pilot before and/or during the triangulation process.

Figure 6:
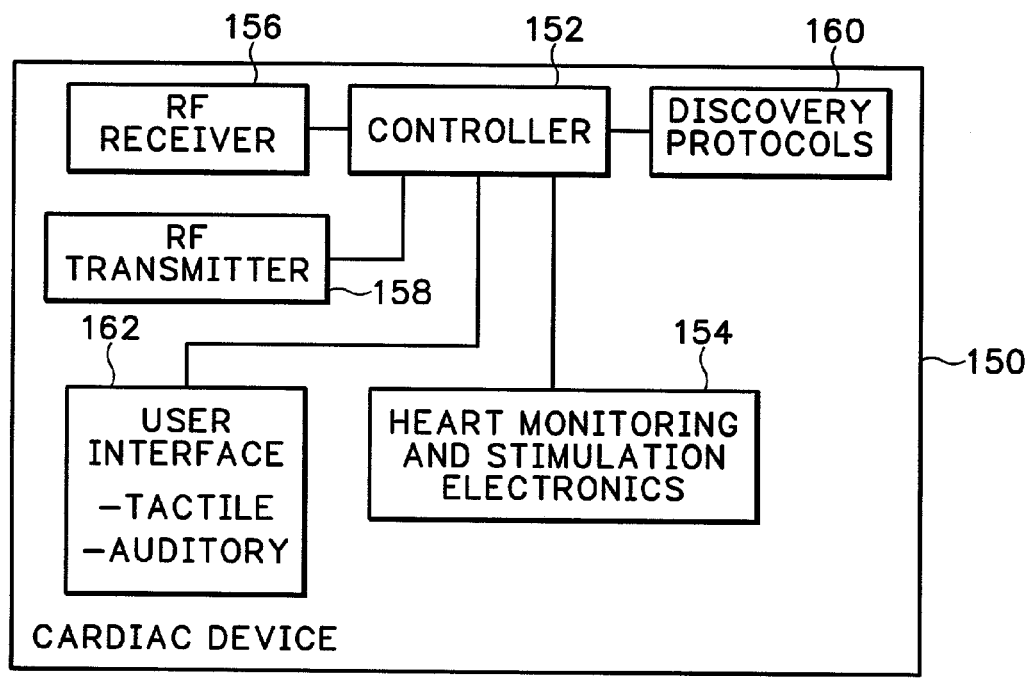
FIG. 6 schematically illustrates one embodiment of a cardiac device with an integrated safety device for use in the detection, prevention, and/or avoidance of unwanted or potentially harmful RF radiation from electronic devices utilizing a discovery protocol.

FIG. 6 illustrates an embodiment of a cardiac device 150 with an integrated safety device. The cardiac device 150 may be a pacemaker, an implantable defibrillator, or other such device that regulates and/or monitors cardiac function. The cardiac device 150 has a controller 152 which may include an ASIC, a suitably programmed microprocessor, discrete logic components, distributed processing components, or any combination thereof. In one embodiment, the cardiac device 150 has heart monitoring and stimulation electronics 154 which perform the life sustaining and saving functions of keeping the cardiac device wearer's heart beating properly. The cardiac device 150 also has an RF receiver 156 and an RF transmitter 158 which are coupled to the controller 152. The RF receiver 156 and controller 152 monitor for incoming coded data sequences 56. The RF transmitter 158 and controller 152 transmit outgoing coded data sequences 58 timed so that the transmissions will not interfere with operation of the heart monitoring and stimulation electronics 154. The controller 152 may be configured to receive and transmit one or more discovery protocols 160, including Bluetooth, IEEE 802.11, cellular communication, radio modem, and/or two-way paging. The cardiac device 150 has a user interface 162, coupled to the controller 152, which may be tactile, and/or auditory in this embodiment.

Figure 7:
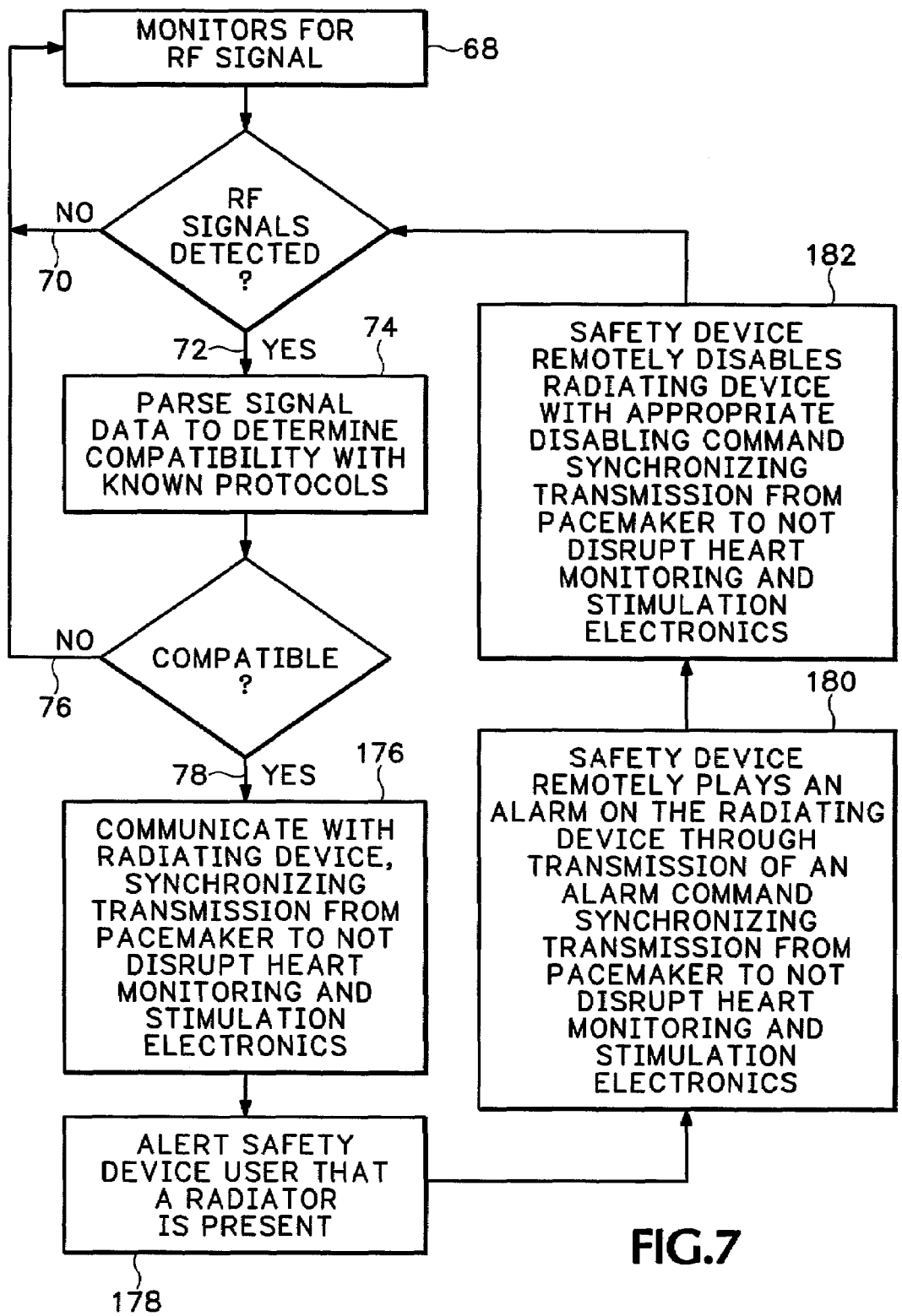
FIG. 7 illustrates one embodiment of actions which may be performed by a cardiac device with a safety device for use in the detection, prevention and/or avoidance of unwanted or potentially harmful RF radiation from electronic devices utilizing a discovery protocol.

FIG. 7 illustrates one embodiment of actions which may be performed by the cardiac device 150. Like the safety devices 48, 90 already discussed, the cardiac device 150 monitors 68 for an RF signal from an intentional radiator 24, using a compatible discovery protocol 60. These actions 68–78 have already been discussed with respect to FIG. 2. If the signal data is compatible 78 with the known discovery protocols 60, then the cardiac device 150 communicates 176 with the radiating device 24 to discover information about the radiating device 24. This communication 176, as well as all transmissions from the cardiac device 150 are synchronized 176 with the heart monitoring and stimulation electronics 154 so as not to interfere with their activity.

At any time after compatibility with a known discovery protocol has been determined 174, the cardiac device 150 with a user interface 162 may alert 178 the cardiac device 150 wearer that an undesired RF signal from a known device is present or in proximity to the cardiac device 150. Since the cardiac device 150 is implanted in the user, this alert 178 can be tactile, and/or auditory.

At any time after compatibility with a known discovery protocol has been determined 174, the cardiac device 150 may remotely play 180 an alarm on the radiator 24 through transmission of an alarm command in the discovery protocol. This transmission should be synchronized so it will not interfere with the heart monitoring and stimulation electronics. The sounding alarm on the radiator 24 may help the cardiac device user locate and avoid the offending device, or the alarm may alert the device owner that they have an actively transmitting device which needs to be disabled.

At any time after compatibility with a known discovery protocol has been determined 174, a cardiac device 150 may remotely disable 182 the radiator 24 with an appropriate disabling command in the discovery protocol. This transmission should be synchronized so it will not interfere with the heart monitoring and stimulation electronics. This action would not require intervention on the part of the cardiac device user.

The actions illustrated in FIG. 7 represent one embodiment of actions which may be performed by a cardiac device 150. A cardiac device 150 may also perform a subset of the actions illustrated in the embodiment of FIG. 7.

Although discovery protocols described herein include Bluetooth, IEEE 802.11, cellular phone, radio modem, and 2-way pager, it is apparent that other discovery protocols may be used, and are deemed to be within the scope of the claims below. The embodiments discussed herein have described the interaction of a safety device or a cardiac device with one intentional radiator at a time. This method of description was adopted to simplify the explanation of the embodiments, and is not intended to limit the scope of the claims below. It is apparent that a safety device and cardiac device may interact and communicate with several intentional radiating devices simultaneously, or in multiplexed order. Additionally, it is apparent that a variety of other structurally and functionally equivalent modifications and substitutions may be made to implement an embodiment of a safety device or a cardiac device according to the concepts covered herein, depending upon the particular implementation, while still falling within the scope of the claims below.

We claim:
1. A safety device comprising:
    a radio frequency (RF) receiver;
    an RF transmitter; and
    a controller coupled to the receiver and transmitter, wherein the controller utilizes at least one discovery protocol to determine the presence of a radiator, wherein the controller parses RF signal data received by the receiver, determines the compatibility of the signal data with at least one discovery protocol, and communicates with the radiator using the transmitter, receiver, and at least one discovery protocol to determine information about the radiator which is helpful in locating or disabling the radiator.

2. The safety device according to claim 1, further comprising a user interface, coupled to the controller, to alert a user of the safety device of the presence of the radiator.

3. The safety device according to claim 2, wherein the user interface comprises a visual user interface to alert the user of the safety device of the presence of the radiator.

4. The safety device according to claim 2, wherein the user interface comprises a tactile user interface to alert the user of the safety device of the presence of the radiator.

5. The safety device according to claim 2, wherein the user interface comprises an auditory user interface to alert the user of the safety device of the presence of the radiator.

6. The safety device according to claim 1, wherein at least one discovery protocol is selected from the group consisting of a Bluetooth protocol, an IEEE 802.11 protocol, a cellular communication protocol, a radio modem protocol, and a two-way paging protocol.

7. The safety device according to claim 1 further comprising a user interface coupled to the controller.

8. The safety device according to claim 7, wherein the controller alerts a safety device user, through the user interface, that the radiator is in proximity to the safety device.

9. The safety device according to claim 7, wherein:
the information that the controller determines about the radiator includes a global positioning system (GPS) location of the radiator; and
the controller reports the radiator's GPS location via the user interface.

10. The safety device according to claim 1, wherein the controller disables the radiator through transmission of a disabling command available in at least one discovery protocol.

11. The safety device according to claim 1, wherein the controller remotely plays an alarm on the radiator through transmission of an alarm command available in at least one discovery protocol.

12. The safety device according to claim 1, further comprising of a global positioning system (GPS) coupled to the controller.

13. The safety device according to claim 12, further comprising a user interface.

14. The safety device according to claim 1, wherein:
the information that the controller determines about the radiator includes a global positioning system (GPS) location of the radiator; and
the controller:
  determines a safety device GPS location via the GPS system coupled to the controller;
  compares the radiator GPS location to the safety device GPS location to determine a relative direction from the safety device to the radiator; and
  reports the relative direction from the safety device to the radiator via the user interface.

15. The safety device according to claim 14, wherein the controller disables the radiator through transmission of a disabling command available in at least one discovery protocol.

16. The safety device according to claim 14, wherein the controller remotely plays an alarm on the radiator through transmission of an alarm command available in at least one discovery protocol.

17. The safety device according to claim 14, wherein the controller:
compares the radiator GPS location to the safety device GPS location to determine a relative distance from the safety device to the radiator; and
reports the relative distance from the safety device to the radiator via the user interface.

18. A cardiac device, comprising:
heart monitoring and stimulating electronics; and
the safety device of claim 1.

19. An airplane comprising:
avionics; and
the safety device of claim 1.

20. A discovery protocol command, comprising:
a coded data sequence, wherein the coded data sequence is sent from a first electronic device to a second electronic device, instructing the second electronic device to disable any radiating communications transmitted from the second electronic device;
wherein the coded data sequence is sent from the first electronic device to the second electronic device after the first electronic device detects the radiating communications, determines compatibility of the radiating communications with at least one discovery protocol wherein compatibility indicates a presence of the second electronic device, and communicates with the second electronic device using at least one discovery protocol to discover information about the second electronic device.

21. The discovery protocol command of claim 20, wherein the coded data sequence is compatible with a least one discovery protocol selected from the group consisting of a Bluetooth protocol, an IEEE 802.11 protocol, a cellular communication protocol, a radio modem protocol, and a two-way paging protocol.

22. A safety method, comprising:
detecting a radio frequency (RF) inquiry;
determining compatibility of a RF signal with at least one discovery protocol, wherein compatibility indicates the presence of a radiator; and
communicating with the radiator using at least one discovery protocol to discover information about the radiator.

23. The safety method according to claim 22, further comprising alerting a person that the radiator is present.

24. The safety method according to claim 23, wherein alerting a person that the radiator is present comprises emitting an audible signal.

25. The safety method according to claim 23, wherein alerting a person that the radiator is present comprises emitting a visible signal.

26. The safety method according to claim 23, wherein alerting a person that the radiator is present comprises creating a tactile signal.

27. The safety method according to claim 22, further comprising reporting the information about the radiator, wherein the information about the radiator is selected from the group consisting of a device name, product type, an owner's name, and a device location.

28. The safety method according to claim 22, further comprising notifying an owner or an operator of the radiator to disable the radiator.

29. The safety method according to claim 22, further comprising sending a discovery protocol alarm command to the radiator, causing an alarm to play on the radiator.

30. The safety method according to claim 22, further comprising sending a discovery protocol disabling command to the radiator, causing the radiator to be remotely disabled.

31. The safety method according to claim 22, further comprising:

determining a first global positioning system (GPS) location of a safety device;

determining a second GPS location from the radiator using at least one known discovery protocol;

comparing the first GPS location to the second GPS location to determine a relative direction from the first GPS location to the second GPS location; and reporting the relative direction from the first GPS location to the second GPS location.

32. The safety method according to claim 31, further comprising:

comparing the first GPS location to the second GPS location to determine a relative distance from the first GPS location to the second GPS location; and reporting the relative distance from the first GPS location to the second location.

33. The safety method according to claim 22, wherein communicating with the radiator using at least one discovery protocol is synchronized with a cardiac device's heart monitoring and stimulation electronics so as not to interfere with the cardiac device.

34. The safety method according to claim 33, further comprising alerting a person wearing the cardiac device that the radiator is present.

35. A safety method, comprising:

detecting a radio frequency (RF) inquiry using a master safety device;

determining compatibility of a RF signal with at least one discovery protocol, wherein compatibility indicates the presence of a radiator;

communicating with the radiator using at least one discovery protocol;

determining a distance from the radiator to the master safety device;

instructing a first slave safety device to communicate with the radiator;

determining a distance from the radiator to the first slave safety device;

instructing a second slave safety device to communicate with the radiator;

determining a distance from the radiator to the second slave safety device; and triangulating the position of the radiator using the distances from the master safety device, the first slave safety device, and the second slave safety device to the radiator.

36. A discovery protocol command, comprising:

a coded data sequence, wherein the coded data sequence is sent from a first electronic device to a second electronic device, instructing the second electronic device to create an alarm indicating that radiating communications should be disabled on the second electronic device;

wherein the coded data sequence is sent from the first electronic device to the second electronic device after the first electronic device detects the radiating communications, determines compatibility of the radiating communications with at least one discovery protocol wherein compatibility indicates a presence of the second electronic device, and communicates with the second electronic device using at least one discovery protocol to discover information about the second electronic device.

37. The discovery protocol command of claim 36, wherein the coded data sequence is compatible with a protocol selected from the group consisting of a Bluetooth protocol, an IEEE 802.11 protocol, a cellular phone protocol, a radio modem protocol, a two-way pager protocol.

* * * * *